United States Patent [19]

Ono et al.

[11] Patent Number: 4,631,721
[45] Date of Patent: Dec. 23, 1986

[54] BIDIRECTIONAL COMMUNICATION SYSTEM OF A TWO-WIRE BUS COMPRISING AN ACTIVE TERMINATOR

[75] Inventors: Tatsuhiro Ono; Shin'ichi Koike; Haruhiko Tsuchiya, all of Tokyo; Yuji Inoue, Kanagawa, all of Japan

[73] Assignees: NEC Corporation; Nippon Telegraph & Telephone Public Corporation, both of Tokyo, Japan

[21] Appl. No.: 640,917

[22] Filed: Aug. 15, 1984

[30] Foreign Application Priority Data

Aug. 16, 1983 [JP] Japan .................................. 58-149339

[51] Int. Cl.⁴ ............................. H04J 3/02; H04J 3/06
[52] U.S. Cl. ........................................ 370/85; 370/100
[58] Field of Search .................................. 370/85, 100

[56] References Cited

U.S. PATENT DOCUMENTS

| | | | |
|---|---|---|---|
| 3,846,587 | 11/1974 | Schenket et al. | 370/85 |
| 4,052,547 | 10/1977 | MacKay | 370/85 |
| 4,161,786 | 7/1979 | Hopkins et al. | 370/85 |
| 4,271,505 | 6/1981 | Menot et al. | 370/85 |

*Primary Examiner*—Douglas W. Olms
*Assistant Examiner*—Frank M. Scutch, III
*Attorney, Agent, or Firm*—Sughrue, Mion, Zinn, Macpeak and Seas

[57] ABSTRACT

In a communication system comprising a two-wire bus, bidirectional communication is carried out in a time division multiple access fashion through the two-wire bus between a plurality of terminal equipments (26) coupled to the two-wire bus and a central terminator (24) connected to one end of the two-wire bus which has the other end terminated by an active terminator (25). The central terminator transmits, to the two-wire bus, a down burst comprising a down synchronization signal and a down information signal. Each terminal equipment establishes synchronization with reference to the down synchronization signal and thereafter receives the down information signal. The active terminator sends, towards the central terminator, only an up synchronization signal produced with reference to the down synchronization signal extracted from the down burst. Each terminal equipment transmits an up information signal towards the central terminator in the form of an up burst with reference to the up synchronization signal. The up information signal may be sent back to the two-wire bus by the central terminator to carry out communication among the terminal equipments.

6 Claims, 17 Drawing Figures

BIDIRECTIONAL COMMUNICATION SYSTEM OF A TWO-WIRE BUS COMPRISING AN ACTIVE TERMINATOR

BACKGROUND OF THE INVENTION

This invention relates to a bidirectional communication system for use in carrying out bidirectional communication in a time division fashion by the use of a two-wire bus.

A conventional bidirectional communication system of the type described has been used in a user-network system of a two-wire bus having a first and a second end. A central terminator, such as a network terminator, is connected through the first end to the two-wire bus on the one hand and to a telephone network or the like on the other hand. A single terminal equipment, such as a telephone set, a personal computer, a facsimile facility, and the like is connected between the first and the second ends with the second end terminated by a usual passive terminator. Bidirectional communication is carried out between the central terminator and the terminal equipment by the use of the two-wire bus. More specifically, a down burst is sent from the central terminator to the terminal equipment through the two-wire bus on arrival of information from the telephone network while an up burst is transmitted from the terminal equipment to the central terminator through the two-wire bus on transmission of information from the terminal equipment. The two-wire bus is used in common by the down burst and the up burst. A collision between the down and the up bursts should be avoided on the two-wire line. Thus, switching between transmission and reception is necessary in the central terminator and the terminal equipment.

In addition, synchronization should be established in each of the central terminator and the terminal equipment each time when the communication is carried out.

Necessity of the above-mentioned switching and the establishment of synchronization restricts the bidirectional communication system of two-wire bus to one-to-one communication between the central terminator and the terminal equipment.

According to a CCITT recommendation, time division multiplex communication is preferably carried out in a four-wire bus communication system, not in the two-wire bus communication system.

Under the circumstances, it might be very useful to provide a two-wire bus communication system which can carry out time division multiplex communication.

SUMMARY OF THE INVENTION

It is therefore an object of this invention to provide a bidirectional communication system of a two-wire bus, which enables multiplex communication in a time division fashion.

It is another object of this invention to provide a bidirectional communication system of the type described, wherein a plurality of terminal equipments may communicate with a central terminator in a time division multiple access fashion.

It is a specific object of this invention to provide a bidirectional communication system of the type described, wherein communication can be carried out between the terminal equipments.

A bidirectional communication system to which this invention is applicable is for use in carrying out bidirectional communication in a time division fashion through a two-wire bus having a first and a second end. The system comprises a central terminator connected to the first end for transmitting a down burst from the first end towards the second end and for receiving an up burst oriented from the second end towards the first end. The down and the up bursts include a down and an up synchronization signal, respectively. According to this invention, the system comprises an active terminator connected to the second end and responsive to the down burst for deriving the down synchronization signal from the down burst to establish synchronization of the active terminator with reference to the down synchronization signal and thereafter to deliver the up synchronization signal in relation to the down synchronization signal towards the first end, and at least one terminal equipment intermediate between the first and the second ends for carrying out reception of the down burst in response to the down synchronization signal so as to form the up burst in response to the up synchronization signal.

DESCRIPTION OF THE PREFERRED EMBODIMENTS

Figure 1:
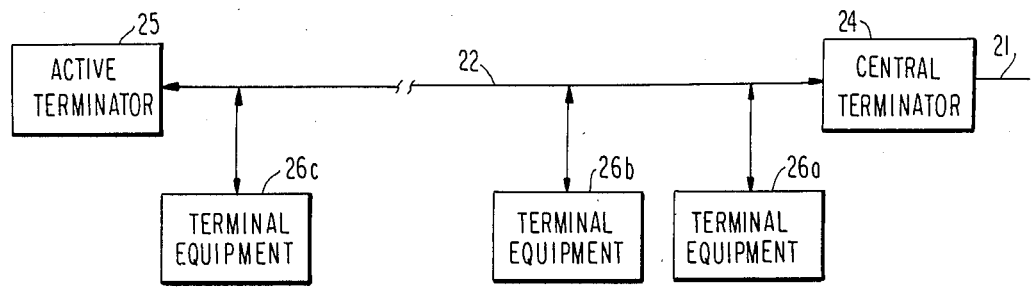
FIG. 1 is a block diagram of a bidirectional communication system according to a preferred embodiment of this invention.

Referring to FIG. 1, a bidirectional communication system according to a preferred embodiment of this invention is connected through a subscriber line 21 to a telephone network (not shown) comprising an exchange. The illustrated system comprises a two-wire bus 22 having a first end and a second end on the righthand side and the lefthand side of the figure, respectively. The bidirectional communication system is for carrying out bidirectional communication with the telephone network in a time division fashion through the subscriber line 21 and the two-wire bus 22. The two-wire bus 22 is, for example, 500 meters long.

A central terminator 24 is connected between the first end of the two-wire bus 22 and the subscriber line 21 and may be called a central equipment or a network terminator. Structure and operation of the central terminator 24 will be described later in detail.

The second end of the two-wire bus 22 is terminated by an active terminator 26 which is different in structure and operation from a usual passive terminator as will become clear later. In the example being illustrated, a plurality of terminal equipments represented by 26a, 26b, and 26c, such as a telephone set, a facsimile facility, or the like, are removably connected to the two-wire bus 22 through sockets or receptacles (not shown) in the manner which will later be described in detail. Thus, the terminal equipments 26a to 26c may selectively be connected to the two-wire bus 22.

Figure 2:
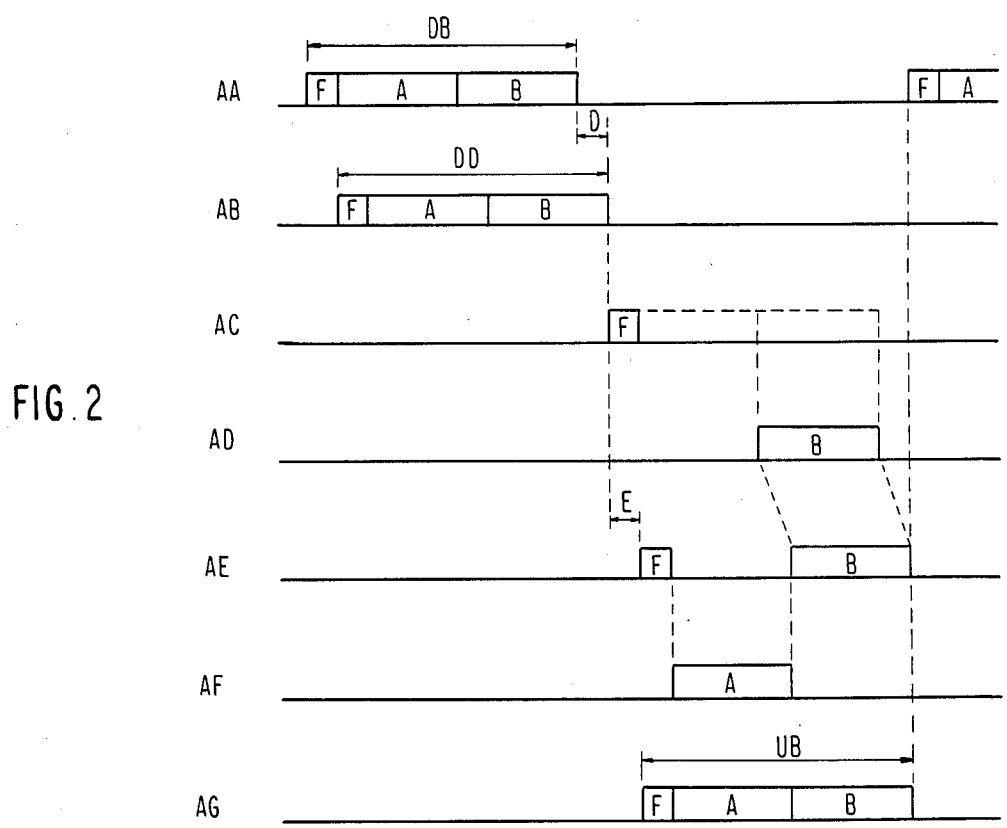
FIG. 2 is a time chart for use in describing operation of the bidirectional communication system illustrated in FIG. 1.

Referring to FIG. 2 and FIG. 1 again, a down burst DB is transmitted in a down frame from the central terminator 24 towards the active terminator 25 on selectively delivering information from the central terminator 24 to the terminal equipments 26a to 26c, as shown along a line labelled AA. The terminal equipments 26a to 26c will be referred to as first through third equipments, respectively, and are successively remote from the central terminator 24. Thus, the down burst DB is sent downstream from the central terminator 24 towards the active terminator 25. As will later be described in detail, the down frame is repeated at a frame repetition rate of, for example, 8 kHz. For the time being, it may be understood that the down frame comprises a down synchronization area F at the beginning thereof and first and second down channels A and B following the down synchronization area F. Let the first and the second down channels A and B be assigned to the first and the third equipments 26a and 26c, respectively. Responsive to a down synchronization signal F placed in the down synchronization area, the first equipment 26a establishes frame synchronization. The down synchronization signal will be designated also by F, as long as confusion does not arise. This applies to the other signals and areas. Establishment of frame synchronization in each of the first and the third equipments 26a and 26c is possible by repeatedly transmitting the down synchronization signal F from the central terminator 24 and by detecting repetition of the down synchronization signal F in each of the first and the third equipments 26a and 26c. Such transmission and detection of the down synchronization signal F will be described later. Thereafter, the first and the third equipments 26a and 26c receive down information through the first and the second down channels A and B, respectively.

The down burst DB arrives at the active terminator 25 after a time delay D as a delayed down burst DD comprising the down synchronization signal F and the down information arranged in the first and the second down channels A and B, as shown along another line labelled AB. Responsive to the delayed down burst DD, the active terminator 25 extracts the down synchronization signal F from the delayed down burst DD to establish frame synchronization of the active terminator 25 like each of the first and the third equipments 26a and 26c. After the frame synchronization is established in the active terminator 25, the active terminator 25 returns the down synchronization signal F of the delayed down burst DD back to the central terminator 24 as an up synchronization signal after lapse of the delayed down burst DD as shown along a third line labelled AC. The up synchronization signal is a reproduction of the down synchronization signal F and will therefore be represented by the same reference symbol F. Thus, the up synchronization signal F is sent upstream from the active terminator 25. Anyway, an up frame is defined by the up synchronization signal F and has the length of the down frame and a first and a second up channel A and B like the down frame.

The up synchronization signal F arrives at the third equipment 26c at first and then at the first equipment 26a. Let the first and the third equipments 26a and 26c transmit equipment information towards the central terminator 24 through the first and the second up channels A and B, respectively. It should be noted in this connection that a time delay is neglected in the third line AC for the travel of the up synchronization signal F between the active terminator 25 and the third equipment 26c. The third equipment 26c establishes frame synchronization with reference to the up synchronization signal F in a manner to be described later and produces the equipment information in the second up channel B assigned to the third equipment 26c as shown along a fourth line labelled AD. As illustrated along the line AD, the equipment information is produced by the third equipment 26c after lapse of a duration for the first up channel A from reception of the up synchronization signal F.

The up synchronization signal F is received at the first equipment 26a with a time delay E after production of the up synchronization signal F from the active terminator 25, as illustrated along a fifth line labelled AE. The first equipment 26a produces the equipment information through the first up channel A with reference to the received up synchronization signal F as shown along a sixth line labelled AF.

The equipment information of the first equipment 26a is thus assigned to the first up channel A and is followed by that produced by the second equipment 26c in the second up channel B. As a result, the up frame is formed by a combination of the up synchronization signal F and the equipment information arranged in the first and the second up channels A and B and is given as an up burst UB to the central terminator 24 as shown along the bottom line labelled AG. The central terminator 24 processes the up burst UB in a manner to be described and transfers the up burst UB either to the subscriber line 21 or back to the two-wire bus 22. When the equipment information in the up burst UB is returned back to the two-wire bus 22, the equipment information can be delivered to one of the terminal equipments 26a to 26c that is different from the terminal equipments transmitting the equipment information. Thus, communication is possible among the terminal equipments 26a to 26c through the central terminator 24.

Figure 3:
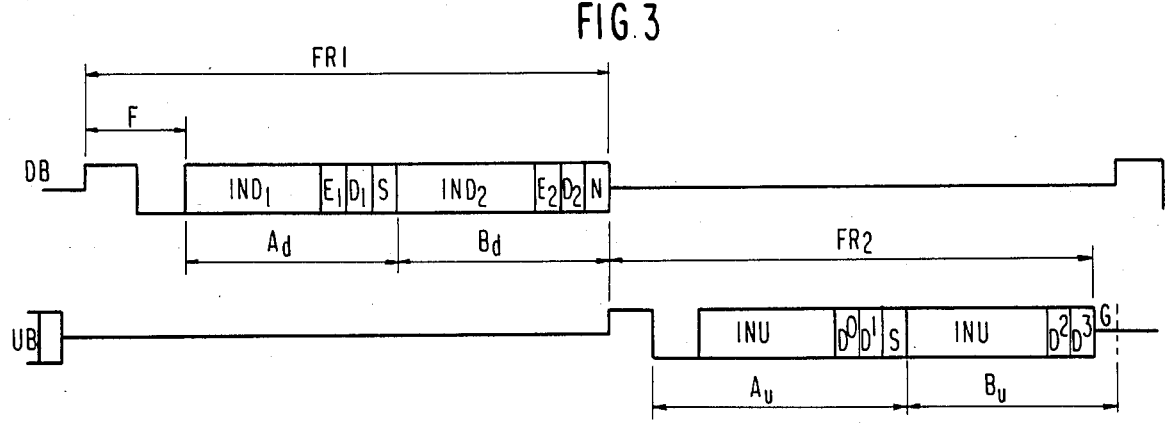
FIG. 3 is a time chart for use in describing in detail a part of the time chart illustrated in FIG. 2.
Figure 4:
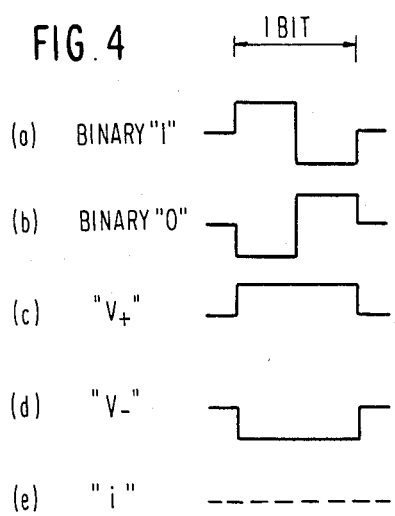
FIG. 4 shows a waveform for use in describing the Manchester codes transmitted in the system illustrated in FIG. 1.
Figure 5:
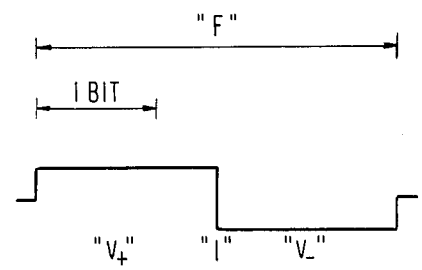
FIG. 5 shows a waveform of a synchronization signal used in the system illustrated in FIG. 1.

Referring to FIGS. 3 through 5, the down and the up bursts DB and UB are arranged in the down and the up frames denoted at $FR_1$ and $FR_2$ in FIG. 3, respectively. A succession of digital signals, such as the down and the up synchronization signals, is put in each of the down and the up frames $FR_1$ and $FR_2$ and is formed by the Manchester code known in the art. The Manchester code will be described with reference to FIG. 4 for a better understanding of this invention.

In FIG. 4, binary digits "1" and "0" are represented by the Manchester codes in the manner illustrated in (a) and (b), respectively. Specifically, the binary digit "1" is specified by a pair of a positive pulse and a negative pulse following the positive pulse while the binary digit "0", another pair of a negative pulse and a positive pulse succeeding the negative pulse. The former pair and the latter pair may be referred to as a code "1" and a code "0" of the Manchester codes, respectively. Positive and negative violation codes "$V_+$" and "$V_-$" are illustrated at (c) and (d), respectively, and are attained by violating an encoding rule of the Manchester code. Specifically, the positive violation code "$V_+$" is specified by a positive pulse lasting a single bit duration while the negative violation code "$V_-$", a negative pulse lasting the single bit duration. An idle state "i" is illustrated at (e) and appears in the absence of any signal to be carried. The idle state "i" is intermediate between the positive and the negative pulses. Thus, the Manchester code takes five states illustrated at (a) through (e).

In FIG. 3, each digital signal is specified by one of the five states. This means that the positive and the negative violation codes "$V_+$" and "$V_-$" are also used to carry each digital signal. For example, each of the down and the up synchronization signals F is represented by a three-bit concatenation of the Manchester codes. As shown in FIG. 5, the concatenation is formed by the positive violation code "$V_+$", the code "1", and the negative violation code "$V_-$".

The down and the up synchronization signals F illustrated in FIG. 5 are placed at the beginnings of the down and the up frames $FR_1$ and $FR_2$ and are succeeded by the first and the second up channels A and B, respectively, as shown in FIG. 3. As regards the down frame $FR_1$, the first down channel A comprises a first down information area $IND_1$ of 8 bits, a first echo area $E_1$ of 1 bit, a first down control area $D_1$ of 1 bit, and a spare bit area S of 1 bit. The first down information area $IND_1$, the first echo area $E_1$, and the first control area $D_1$ are for arranging a first down information signal, a first echo bit, and a first down control bit, respectively. The first echo bit and the first down control bit will become clear as the description proceeds.

Likewise, the second down channel B comprises a second down information area $IND_2$ of 8 bits for a second down information signal, a second echo area $E_2$ for a second echo bit, and a second down control area $D_2$ for a second down control bit. The second down control area $D_2$ is followed by a down frame indication area N. The down burst indication area N is for positioning a down frame indication signal represented by the code "1".

The first and the second down information signals $IND_1$ and $IND_2$, the first and the second echo signals $E_1$ and $E_2$, the first and the second control signals $D_1$ and $D_2$, and the down frame indication signal N are produced as the digital signal succession.

As regards the up frame $FR_2$, the first up channel A comprises a first up information area $INU_1$ of 8 bits for a first up information signal, a first up control area $D^0$ and $D^1$ for a first pair of up control bits, and a spare bit area S. The up control bits will become clear as the description proceeds.

Similarly, the second up channel B comprises a second up information area $INU_2$ for a second up information signal, a second up control area $D^2$ and $D^3$ for a second pair of up control bits. The second up channel B further comprises a guard bit area G at the end of the second up channel B. The guard bit area G is assigned with a guard bit specified by the idle state (i). The guard bit G serves to distinguish the up frame $FR_2$ from the down frame $FR_1$ and may therefore be referred to as an up frame identification signal.

Figure 6:
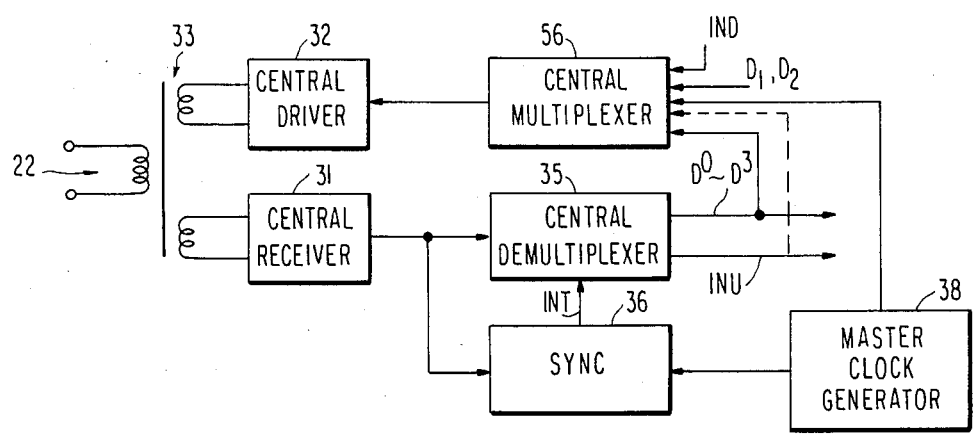
FIG. 6 is a block diagram of a central terminator for use in the system illustrated in FIG. 1.

Referring to FIG. 6 together with FIGS. 1 and 3, the central terminator 24 comprises a central receiver 31 and a central driver 32 both of which are coupled to the two-wire bus 22 through a transformer 33. Supplied with the up burst UB arranged in the up frame $FR_2$ illustrated in FIG. 3, the central receiver 31 carries out level conversion of the received up burst UB to deliver a received code succession to a central demultiplexer 35 and a synchronization circuit (SYNC) 36 operable in response to a sequence of clock pulses given from a master clock generator 38.

Figure 7:
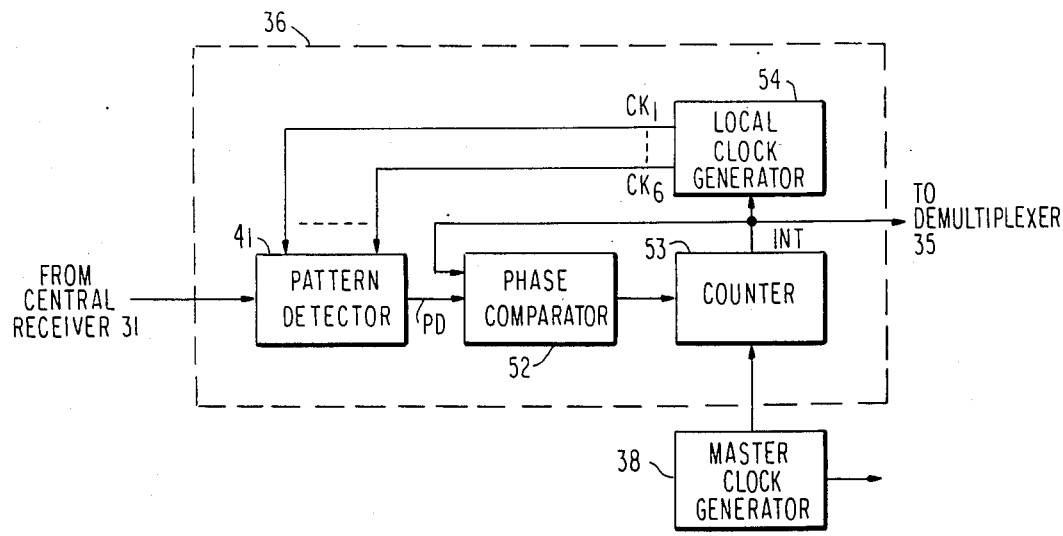
FIG. 7 is a block diagram for use in describing a synchronization circuit for use in the central terminator illustrated in FIG. 6.
Figure 8:
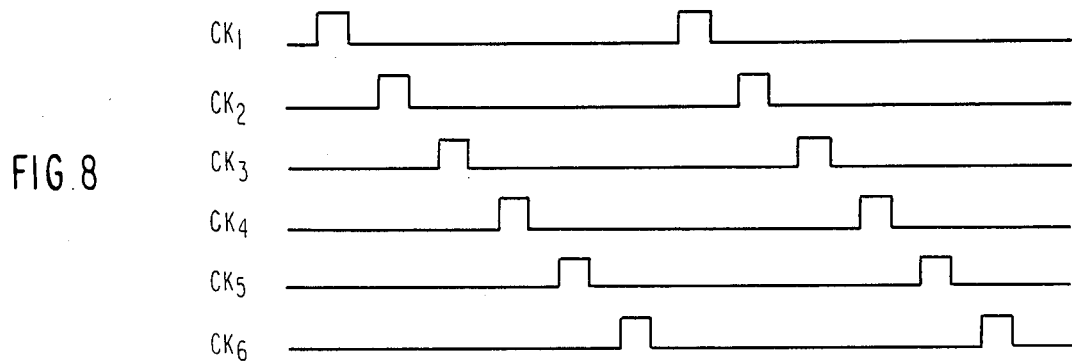
FIG. 8 is a time chart for use in describing operation of the syhchronization circuit illustrated in FIG. 7.

Referring now to FIGS. 7 through 10 and to FIG. 6 again, the synchronization circuit 36 comprises a pattern detector 41 supplied with the received code succession from the central receiver 31. The pattern generator 41 is also supplied with first through sixth local clocks $CK_1$ to $CK_6$ which have different phases from one another, as shown in FIG. 8, and which are produced in a manner to be presently described. The pattern detector 41 is operable to detect, from the received code succession, the up synchronization signal F illustrated in FIG. 5 with reference to the first through the sixth local clocks $CK_1$ to $CK_6$. The first through the sixth local clocks $CK_1$ to $CK_6$ are given as sampling pulses SP shown in FIG. 9 to the pattern detector 41. The pattern detector 41 successively samples the received code succession by the use of the sampling pulses SP at six sampling instants illustrated in FIG. 9 to produce a pattern detection signal PD representative of detection of the up synchronization signal F.

Figure 10:
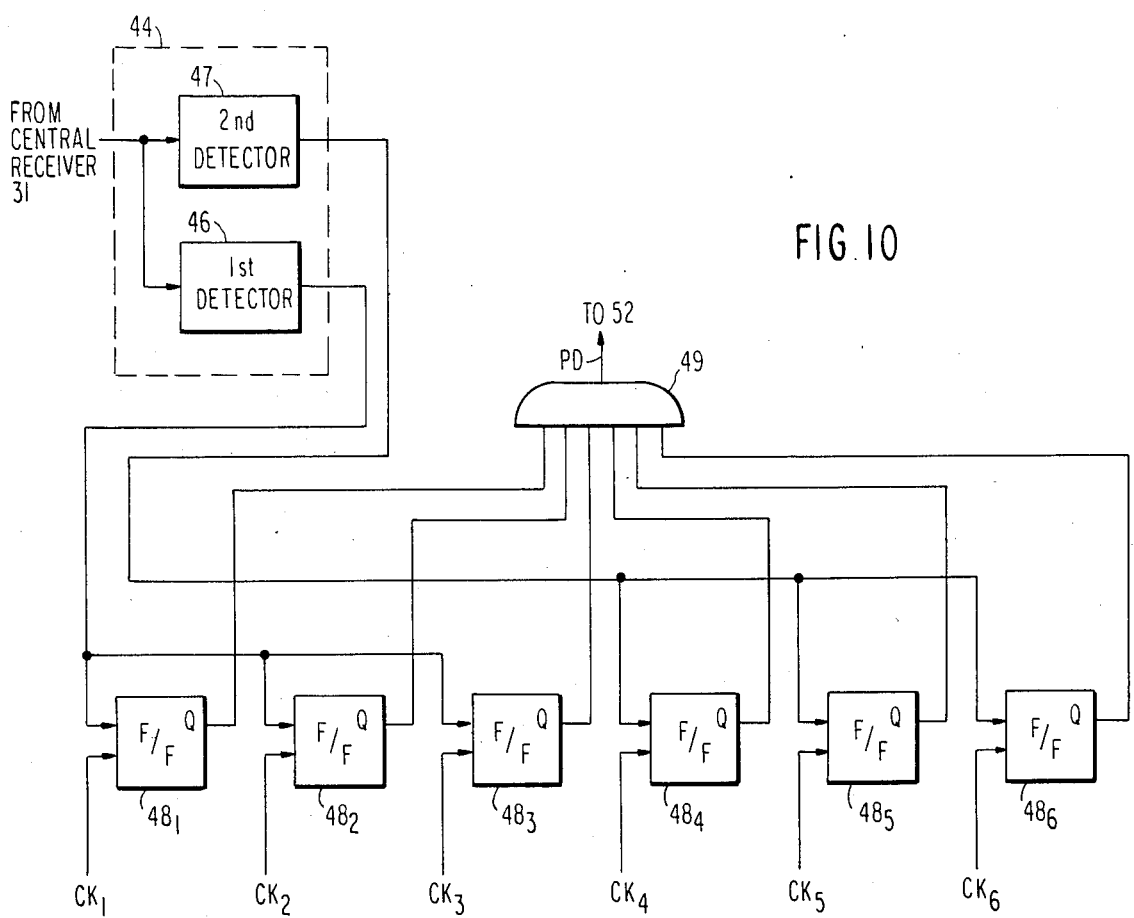
FIG. 10 is a block diagram of a pattern detector for use in the synchronization circuit illustrated in FIG. 7.

As shown in FIG. 10, the pattern detector 41 comprises a code separator 44 supplied with the received code succession from the central receiver 31. The code separator 44 separates the received code succession of the Manchester codes into the positive and the negative pulses. To this end, the code separator 44 comprises first and second detectors 46 and 47 for producing a logic "1" level when given the positive and the negative pulses, respectively. The first detector 46 is connected to first, second, and third flip flops (F/F) $48_1$, $48_2$, and $48_3$ operable in response to the first through the third local clocks $CK_1$ to $CK_3$, respectively. Likewise, the second detector 47 is connected to fourth, fifth, and sixth flip flops $48_4$ to $48_6$ operable in response to the fourth through the sixth local clocks $CK_4$ to $CK_6$, respectively.

Figure 9:
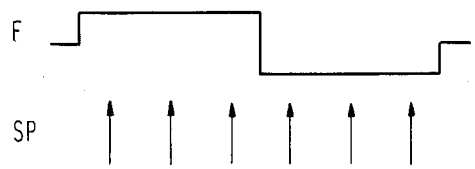
FIG. 9 is another time chart for use in describing operation of the synchronization circuit illustrated in FIG. 7.

As readily understood from FIG. 10, all of the first through the sixth flip flops $48_1$ to $48_6$ supply the logic "1" level to an AND gate 49 on reception of the up synchronization signal F (FIG. 9). Therefore, the AND gate 49 produces the logic "1" level as the phase detection signal PD.

In FIG. 7, the pattern detection signal PD is sent through a phase comparator 52 to a counter 53 operable in response to the master clock pulses supplied from the master clock generator 38. A combination of the phase comparator 52 and the counter 53 serves to produce an internal clock sequence INT and to match a phase of the internal clock sequence INT with the pattern detection signal in a known manner. For this purpose, the internal clock sequence INT is supplied to the phase comparator 52. At any rate, the internal clock pulse sequence INT is phase matched with the pattern detection signal PD and may therefore be called a phase-matched clock sequence. Thus, the central terminator 24 is put into a synchronous state by the phase matching between the internal clock sequence INT and the pattern detection signal PD. In other words, synchronization is established in the central terminator 24.

The internal clock pulse sequence INT is supplied to a local clock generator 54 which may be a frequency divider. In any event, the local clock generator 54 produces the first through the sixth local clocks $CK_1$ to $CK_6$ with reference to the internal clock pulse sequence INT. The internal clock pulse sequence INT is also supplied to the demultiplexer 35 (FIG. 6) as the phase-matched clock sequence.

Turning back to FIG. 6, the phase-matched clock sequence INT is delivered from the synchronization circuit 36 to the central demultiplexer 35. After establishment of the synchronization, the central demultiplexer 35 demultiplexes the received code succession into the first and the second up signals INU (subscripts omitted) and the first and the second up control signals $D^0$ to $D^3$.

The first and the second up control signals $D^0$ to $D^3$ are sent to a central multiplexer 56 operable in response to the master control pulse succession. The central multiplexer 56 comprises an internal control circuit (not shown) responsive to the first and the second up control signals $D^0$ to $D^3$ so as to produce the first and the second echo signals $E_1$ and $E_2$ in accordance with a predetermined rule. Each of the first and the second up control signals $D^0$ and $D_1$ and $D_2$ and $D_3$ may be sent as each echo signal $E_1$ and $E_2$ back to the two-wire bus 22. A multiplexer circuit (not shown) is included in the central multiplexer 56 and is given the first and the second down information signals $IND_1$ and $IND_2$ and the first and the second control signals $D_1$ and $D_2$ from the exchange. The first and the second control signals $D_1$ and $D_2$ serve to access each terminal equipment. The down burst DB (FIG. 2) is produced through the multiplexer circuit under control of the internal control circuit and is sent to the two-wire bus 22 through the central driver 32 and the transformer 33.

The first and the second up information signals $INU_1$ and $INU_2$ may be sent back to the central multiplexer 56 as the first and the second down information signals $IND_1$ and $IND_2$, as shown at a broken line in FIG. 6. With this structure, communication is possible among the terminal equipments through the central terminator 24.

Figure 11:
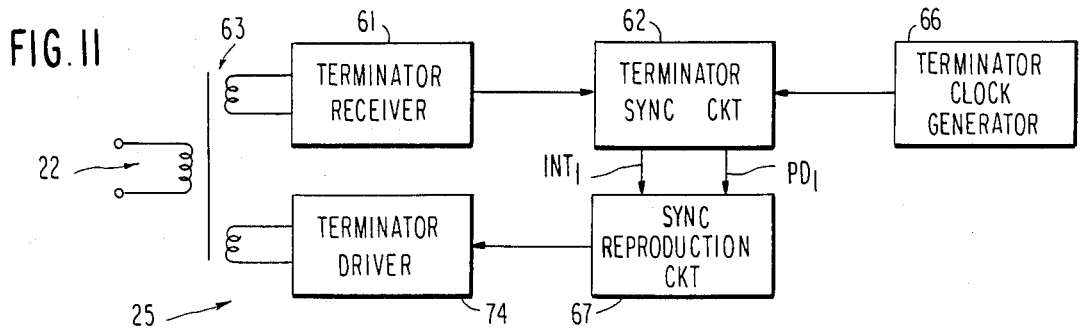
FIG. 11 is a block diagram of an active terminator for use in the system illustrated in FIG. 1.

Referring to FIG. 11, the active terminator 25 comprises a terminator receiver 61 and a terminator synchronization circuit 62 similar to the central receiver 31 and the central synchronization circuit 36 illustrated in conjunction with FIG. 6, respectively. The down burst DB (FIG. 2) is supplied through a terminator transformer 63 and the terminator receiver 61 to the terminator synchronization circuit 62 in the form of a reception code succession. The terminator synchronization circuit 62 is supplied with terminator clock pulses from a terminator clock generator 66 and carries out operation in a manner similar to the central synchronization circuit 36 (FIGS. 6 and 7) so as to produce a terminator internal clock pulse sequence $INT_1$ and a terminator phase detection signal $PD_1$. Anyway, let synchronization be established in the active terminator 25 as a result of phase matching between the reception code succession and the terminator internal clock pulse sequence $INT_1$.

Figure 12:
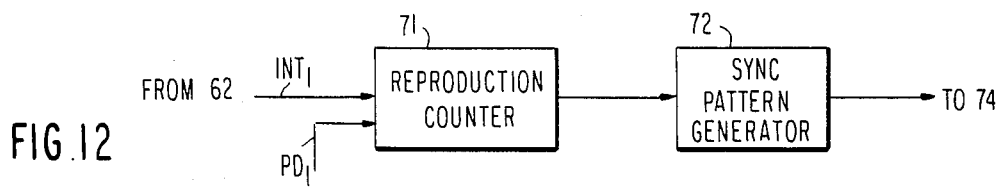
FIG. 12 is a block diagram of a synchronization reproduction circuit for use in the active terminator illustrated in FIG. 11.

Referring to FIG. 12 together with FIG. 11, a synchronization reproduction circuit 67 of the active terminator 25 comprises a reproduction counter 71 responsive to the terminator internal clock pulse sequence $INT_1$ and the terminator phase detector signal $PD_1$. The reproduction counter 71 is reset by the terminator phase detection signal $PD_1$ and begins to count the terminator internal clock pulse sequence $INT_1$. Counting the terminator internal clock sequence $INT_1$ to a predetermined number, the reproduction counter 71 sends an enable signal to a synchronization pattern generator 72. Responsive to the enable signal, the synchronization pattern generator 72 supplies the up synchronization signal F to a terminator driver 74 (FIG. 11). As mentioned before, the up synchronization signal F has the same pattern as the down synchronization signal. At this time, the active terminator 25 never reproduces the other signals, such as IND, D, E, and N, except the down synchronization signal. As a result, the up synchronization signal F alone is sent back to the two-wire bus 22.

Figure 13:
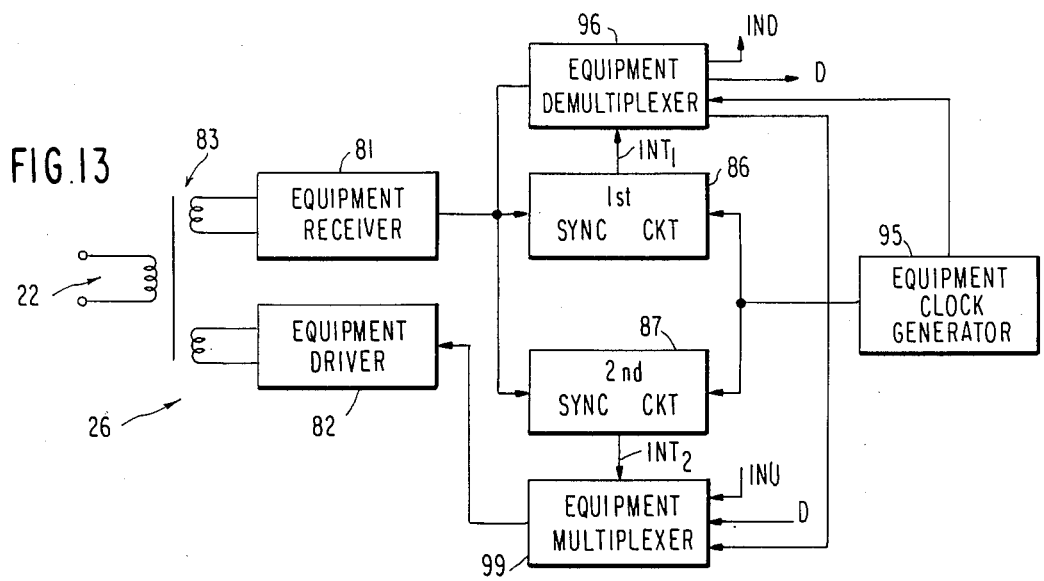
FIG. 13 is a block diagram of a terminal equipment for use in the system illustrated in FIG. 1.

Referring to FIG. 13, each terminal equipment denoted at 26 comprises an equipment receiver 81 and an equipment transmitter 82 which are coupled through an equipment transformer 83 to the two-wire bus 22 and which are similar to the terminator receiver 61 and the terminator driver 74 illustrated in FIG. 11, respectively. The down and the up bursts DB and UB (FIG. 2) are received by the equipment receiver 81 to be sent to first and second synchronization circuits 86 and 87. Detection of the down and the up bursts DB and UB is possible by monitoring the frame synchronizing area F and by monitoring whether the last bit of each frame is either the up burst identification signal N or the guard bit G. The first and the second synchronization circuits 86 and 87 are for detecting the down and the up bursts DB and UB in the above-mentioned manner, respectively.

Figure 14:
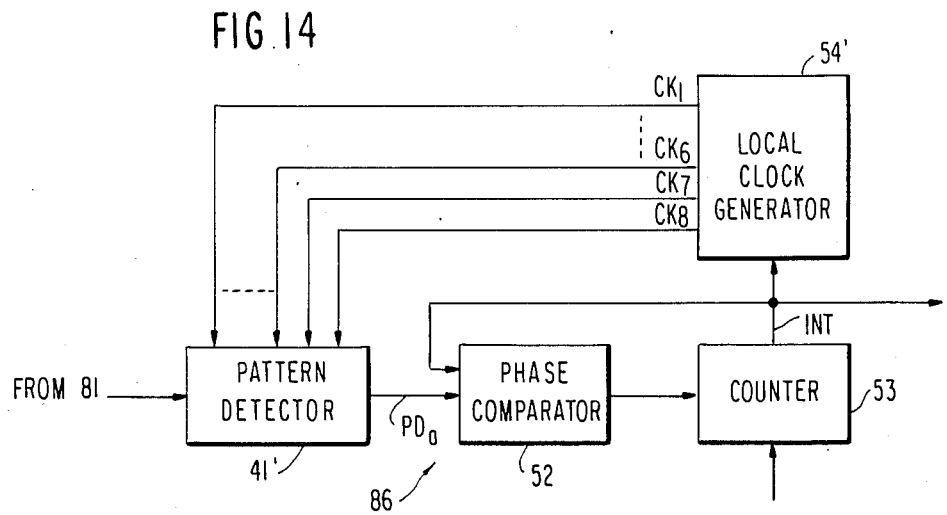
FIG. 14 is a block diagram of a synchronization circuit for use in the terminal equipment illustrated in FIG. 13.
Figure 15:
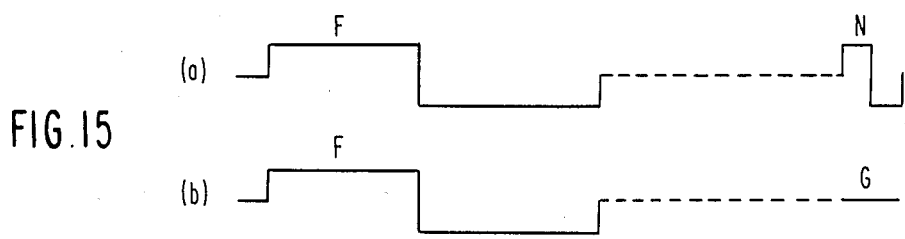
FIG. 15 is a time chart for use in describing operation of the synchronization circuit illustrated in FIG. 14.

Referring to FIGS. 14 and 15, the first synchronization circuit 86 is similar to that illustrated in FIG. 7 except that seventh and eighth local clocks $CK_7$ and $CK_8$ are produced from the local clock generator 54' in addition to the first through the sixth local clocks $CK_1$ to $CK_6$ from the local clock generator 54' and that the pattern generator 41' (FIG. 14) produces an equipment phase detection signal $PD_a$ in consideration of the down burst identification signal N. The down burst identification signal N is represented by the code "1" of the Manchester code, as shown along a line a of FIG. 15.

Figure 16:
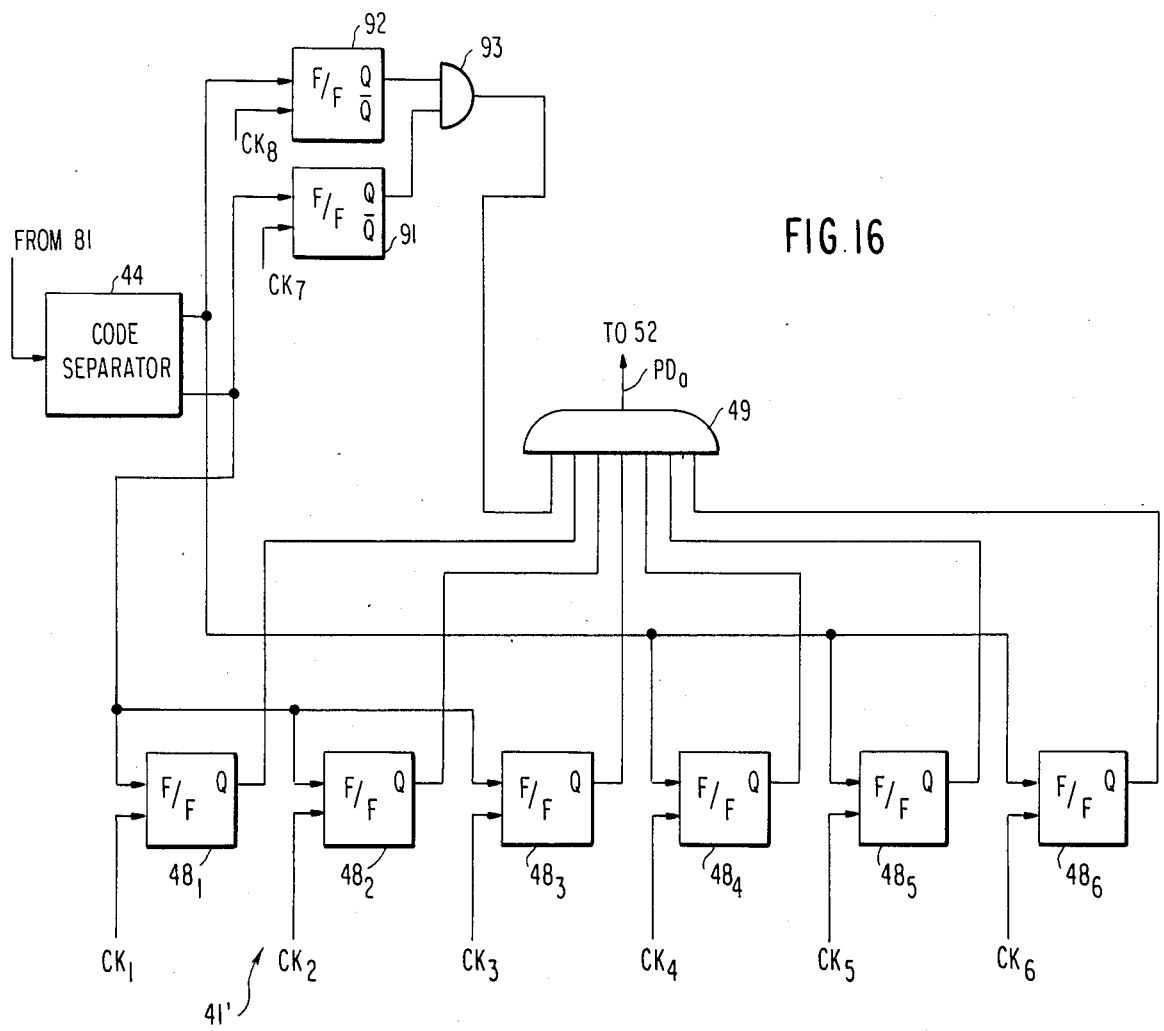
FIG. 16 is a block diagram of a pattern detector for use in the synchronization circuit illustrated in FIG. 14.

Referring to FIG. 16 afresh together with FIG. 14, the pattern detector 41' is similar to that illustrated in FIG. 10 except that first and second additional flip flops 91 and 92 are coupled to the code separator 44 so as to detect the down burst identification signal N and that the AND gate 49 produces the equipment phase detection signal $PD_a$ only on detection of both of the down burst identification signal N and the down synchronization signal F.

More specifically, when the positive pulse of the down burst identification signal N arrives in the presence of the seventh local clock $CK_7$, the first additional flip flop 91 is set to produce the logic "1" level through a positive terminal Q. Similarly, the second additional flip flop 92 produces the logic "1" level through a positive terminal Q when the negative pulse of the down burst identification signal N is given in the presence of the eighth local clock $CK_8$. An additional AND gate 93 supplies the logic "1" level to the AND gate 49 when the logic "1" level is produced from both of the first and the second additional flip flops 91 and 92. At any rate, the down burst identification signal N and the down synchronization signal F are detected by the first synchronization circuit 86 in cooperation with an equipment clock generator 95 (FIG. 13). As a result, the first synchronization circuit 86 is put into operation in synchronism with the down burst DB to deliver a first internal clock succession $INT_1$ to an equipment demultiplexer 96 which is similar in structure and operation to the central demultiplexer 35 illustrated in FIG. 6.

The second synchronization circuit 87 is similar to the first synchronization circuit 86 except that the second synchronization circuit 87 comprises a pattern detector for detecting the guard bit G from the up burst (FIG. 15(b)). Such detection of the guard bit G is possible by monitoring both of negative terminals $\overline{Q}$ of the first and the second additional flip flops 91 and 92 (FIG. 16). The second synchronization circuit 87 produces a second internal clock succession $INT_2$ in synchronism with the up burst UB. The second internal clock succession $INT_2$ is delivered to an equipment multiplexer 99 (FIG. 13).

In FIG. 13, the equipment demultiplexer 96 distributes the down information signal IND with reference to the first and the second down control signals $D_1$ and $D_2$. Furthermore, the echo bit E is delivered from the equipment demultiplexer 96 to the equipment multiplexer 99.

Figure 17:
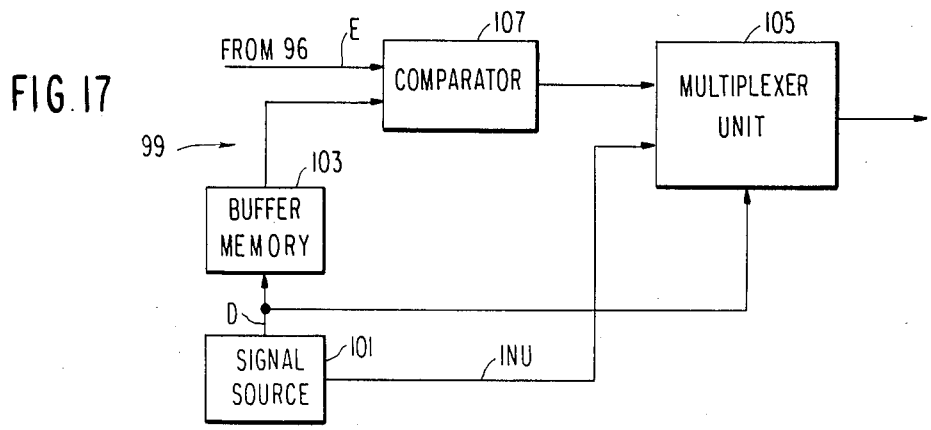
FIG. 17 is a block diagram of an equipment multiplexer for use in the terminal equipment illustrated in FIG. 13.

Referring to FIG. 17 together with FIG. 13, the equipment multiplexer 99 comprises a signal source 101. It is assumed that the signal source 101 produces each of the first and the second up control signals $D^0$ through $D^3$ and that the up information signal INU is also produced from the signal source 101 when the up frame is assigned to the terminal equipment 26 in the following procedure. Each up control signal is delivered from the signal source 101 to a buffer memory 103 and a multiplexer unit 105 in response to a request for transmission of the up information signal INU. As a result, each up control signal is stored in the buffer memory 103 on the one hand and is sent through the multiplexer unit 105 towards the central terminator 24 under control of the second synchronization circuit 87 on the other hand.

The central terminator 24 (FIG. 6) returns each up control signal back to the terminal equipment 26 in the form of the echo bit E. The echo bit E is separated from the down burst DB by the equipment demultiplexer 96 and sent to the equipment multiplexer 99.

A comparator 107 compares the echo bit E sent from the equipment demultiplexer 96 with the up control signal stored in the buffer memory 103 to produce a coincidence signal representative of coincidence between the echo bit E and the stored up control signal. The multiplexer unit 105 transmits a current one of the up control signal together with the up information signal INU to the two-wire bus in response to the coincidence signal. The transmission is continued during production of the coincidence signal. On the other hand, transmission is interrupted on occurrence of noncoincidence between the echo bit E and the stored up control signal because the noncoincidence indicates a busy state in which the two-wire bus 22 is in course of use by any other equipment terminal.

The above-mentioned operation is carried out in accordance with the procedures described in "Study Group XVIII—Report No. R18" published July 1983 by CCITT and will not be described any longer.

While this invention has thus far been described in conjunction with a preferred embodiment thereof, it will readily be possible for those skilled in the art to put this invention into practice in various other manners. For example, two of the terminal equipments can be communicable with each other through the two-wire bus 22. In this event, the up information signal INU is sent from one of the terminal equipment through the central terminator 24 to the other of the terminal equipment. Anyway, it is possible to carry out bidirectional communication between the central terminator and the terminal equipments in a time division multiple access fashion because each of the terminal equipments is put into operation with a phase matched to the down synchronization signal and to the up synchronization signal synchronized with the down synchronization signal. It is possible to use high level data link control procedures (HLDC) on communication between the terminal equipments and the central terminator.

What is claimed is:

1. In a bidirectional communication system for use in carrying out bidirectional communication in a time division fashion through a two-wire bus having a first and a second end, said system comprising a central terminator connected to said first end and an active terminator connected to said second end, said central terminator being for transmitting a down burst from said first end towards said second end and for receiving an up burst transmitted from said second end towards said first end, said down and said up bursts including a down and an up synchronization signal, respectively, the improvement wherein:

each of said down and said up bursts is encoded by the use of the Manchester codes with each of said down and said up synchronization signals having a code pattern formed by a positive violation code "$V_+$", a code "1", and a negative violation code "$V_-$" of said Manchester codes;

said active terminator comprising:

synchronization signal deriving means responsive to said down burst for deriving said code pattern from said down burst to detect said down synchronization signal and to establish synchronization of said active terminator with reference to said down synchronization signal; and synchronization signal delivering means coupled to said synchronization signal deriving means for delivering said up synchronization signal in relation to said down synchronization signal towards said first end; and said system further comprising:

at least one terminal equipment intermediate between said first and said second ends for carrying out reception of said down burst in response to said down synchronization signal so as to form said up burst in response to said up synchronization signal.

2. A bidirectional communication system as claimed in claim 1, wherein said central terminator comprises:
   means for partially sending said up burst back to said two-wire bus as a part of said down burst.

3. A bidirectional communication system as claimed in claim 1, said up burst comprising an up control signal while said down burst comprises a down control signal, wherein said central terminator comprises:
   first means for extracting said up control signal from said up burst; and
   second means coupled to said first means for sending said extracted up control signal back to said two-wire bus as said down control signal.

4. A bidirectional communication system as claimed in claim 1, wherein said active terminator comprises:
   means responsive to said down burst for detecting said down synchronization signal to produce a detection signal synchronized with said down synchronization signal; and
   means for producing said up synchronization signal with reference to said detection signal.

5. A bidirectional communication system as claimed in claim 1, wherein said terminal equipment comprises:
   detecting means responsive to said down and said up bursts for detecting said code pattern to specify the down and the up synchronization signals; and
   processing means coupled to said detecting means for processing said down and said up bursts with reference to the down and the up synchronization signals specified by said detecting means, respectively.

6. A bidirectional communication system as claimed in claim 1, wherein said central terminator comprises:
   code detecting means responsive to said up burst for detecting said code pattern from said up burst to produce a sequence of internal clock pulses with reference to said detected code pattern; and
   means coupled to said code detecting means for transmitting said down burst to said two-wire bus with reference to said internal clock pulse sequence.

* * * * *